United States Patent
Daye et al.

(10) Patent No.: US 11,921,846 B2
(45) Date of Patent: Mar. 5, 2024

(54) AUTOMATIC INTRUSION DETECTION METHOD AND APPARATUS

(71) Applicant: YAHOO ASSETS LLC, Dulles, VA (US)

(72) Inventors: Stav Yanovsky Daye, Givatayim (IL); Ran Wolff, Geva-Carmel (IL)

(73) Assignee: YAHOO ASSETS LLC, New York, NY (US)

(*) Notice: Subject to any disclaimer, the term of this patent is extended or adjusted under 35 U.S.C. 154(b) by 691 days.

(21) Appl. No.: 16/835,871

(22) Filed: Mar. 31, 2020

(65) Prior Publication Data
US 2021/0303913 A1 Sep. 30, 2021

(51) Int. Cl.
*G06F 21/55* (2013.01)
*G06F 18/214* (2023.01)
*G06F 18/22* (2023.01)
*G06F 21/62* (2013.01)

(52) U.S. Cl.
CPC .......... *G06F 21/552* (2013.01); *G06F 18/214* (2023.01); *G06F 18/22* (2023.01); *G06F 21/55* (2013.01); *G06F 21/6218* (2013.01); *G06F 2221/2141* (2013.01)

(58) Field of Classification Search
CPC ......... G06F 21/50–568; G06F 21/6218; G06F 2221/2141; G06K 9/6215; G06K 9/6256
See application file for complete search history.

(56) References Cited

U.S. PATENT DOCUMENTS

| | | | | |
|---|---|---|---|---|
| 2014/0325643 A1* | 10/2014 | Bart | ..................... | H04L 63/1425 726/22 |
| 2016/0048702 A1* | 2/2016 | Furukawa | .............. | G06Q 30/02 726/28 |
| 2020/0076843 A1* | 3/2020 | Luiggi | ................ | H04L 63/1433 |
| 2021/0224282 A1* | 7/2021 | Poirel | ............... | G06F 16/24568 |

FOREIGN PATENT DOCUMENTS

| CN | 107909119 A | * | 4/2018 | ........... G06K 9/6215 |
|---|---|---|---|---|
| EP | 3109771 A1 | * | 12/2016 | |

OTHER PUBLICATIONS

R. Colbaugh and K. Glass, "Proactive defense for evolving cyber threats," Proceedings of 2011 IEEE International Conference on Intelligence and Security Informatics, 2011, pp. 125-130, doi: 10.1109/ISI.2011.5984062. (Year: 2011).*
Lee, Lillian; "Measures of Distributional Similarity," Proceedings of the 37th ACL, 9 pages (1999).
(Continued)

*Primary Examiner* — Madhuri R Herzog
(74) *Attorney, Agent, or Firm* — James J. DeCarlo; Greenberg Traurig, LLP

(57) ABSTRACT

Disclosed are systems and methods for improving interactions with and between computers in distributional similarity identification using randomized observations. In connection with an intrusion detection system monitoring a computing system, a pair of perturbed sample sets are generating using a pair of real sample set (or real observations) and a pair of random sample sets (of randomly-selected observations), and a similarity measuring representing a level of consistency in user behavior is determined. The systems improve the quality and accuracy of the similarity determination for use in intrusion detection.

10 Claims, 8 Drawing Sheets

(56) References Cited

OTHER PUBLICATIONS

Gawron et al., "Sparsity and normalization in word similarity systems," Natural Language Engineering, vol. 22, No. 3, pp. 351-395 (2015).
Kotlerman et al., "Directional distributional similarity for lexical inference," Natural Language Engineering, vol. 16, No. 4, pp. 359-389 (2010).
Maxion et al., "Masquerade Detection Augmented With Error Analysis," IEEE Transactions on Reliability, vol. 53, No. 1, pp. 124-147 (2004).

* cited by examiner

| Real Observations | | n |
|---|---|---|
| V | {1, 1, 2, 2, 2, 2, 2, 2, 2, 2, 2, 2, 3, 3, 3, 3, 3, 3, 4, 5, 5, 5, 5} | 20 |
| W | {1, 1, 2, 2, 2, 2, 2, 3, 4, 5} | 10 |

| Random Observations | | k |
|---|---|---|
| $s_1$ | {1, 2, 2, 3, 5} | 5 |
| $s_2$ | {2, 3, 4, 4, 5} | 5 |

| | d | 1 | 2 | 3 | 4 | 5 | Sum |
|---|---|---|---|---|---|---|---|
| V | P(d) | 0.1000 | 0.4000 | 0.3000 | 0.0500 | 0.1500 | 1.0 |
| W | P(d) | 0.2000 | 0.5000 | 0.1000 | 0.1000 | 0.1000 | 1.0 |
| V+$s_1$ | P(d) | 0.1200 | 0.4000 | 0.2800 | 0.0400 | 0.1600 | 1.0 |
| W+$s_2$ | P(d) | 0.1333 | 0.4000 | 0.1333 | 0.2000 | 0.1333 | 1.0 |
| M | M(d) | 0.1267 | 0.4000 | 0.2067 | 0.1200 | 0.1467 | 1.0 |

Figure 5A

AUTOMATIC INTRUSION DETECTION METHOD AND APPARATUS

FIELD OF THE DISCLOSURE

The present disclosure relates to improvements to intrusion detection systems and specifically to using distributional similarity and perturbed observations in detecting computing system intrusions including unauthorized access to computing system resources.

BACKGROUND

An intrusion detection system typically monitors one or more computing systems, a network comprising a number of computing systems, etc. for malicious activity. One example of an intrusion involves a hacker that has gained access to a computing system using an authorized user's credentials. Once the hacker is able to gain access to the computing system using the authorized user's credentials (e.g., username and password), the computing system considers the hacker to be the authorized user, and the hacker is given the same privileges and access (to data and other system resources) granted to the authorized user. From the perspective of the computing system, the hacker is the authorized user. Using the authorized user's access and privileges, the hacker might gain access to private/confidential information (e.g., for purposes of disseminating and/or altering the information), install malware, modify system code and/or application programs. These are just a few examples of the extent of the harm that can be caused by someone gaining unauthorized access to a computing system.

Given the extent of the harm that can be caused by a hacker masquerading as an unauthorized user, there is significant need to be able to detect such an intrusion. At the same time, it is also important that an intrusion detection system not disrupt an authorized user's use of the computing system. Accordingly, it is important to be able to differentiate between an authorized user and a hacker masquerading as an authorized user.

SUMMARY

The present disclosure provides novel systems and methods for automatic intrusion detection using distribution (or distributional) similarity and randomized observations.

One of the tasks of intrusion detection as disclosed herein is to identify compromised user accounts. For example, a compromised user account can be one in which an individual (or other entity) has obtained an authorized user's credentials (e.g., username and password) for a computing system, has gained access to the system using the authorized user's credentials, and is masquerading within the system as the authorized user.

In most cases, a hacker will behave differently than an authorized user. Thus, a change in behavior associated with a user account can be used to detect a hacker masquerading as an authorized user. In order to detect atypical behavior, typical behavior of the authorized user(s) must first be identified. While it is possible to monitor user behavior in a computing system, it is difficult to identify typical versus atypical behavior patterns of users. An authorized user's behavior with the system can vary from one login to the next. In addition, authorized users can be very diverse both in terms of the resources they use (e.g., request access to) and in the terms of the frequency in which they use (e.g., request access to) the resources. Thus, data associated with user behavior can be sparse making it difficult to identify typical versus atypical user behavior.

For example, the sparsity of user behavior data causes inaccuracies when using existing measurement approaches, such as distributional similarity. Distribution similarity measures the degree to which two probability distributions are similar (or dissimilar).

Presently, Jenson-Shannon Divergence, Kullback-Leibler, Jaccard similarity coefficient and the DICE methods are examples of approaches used in measuring distributional similarity. With each of these approaches, similarity quantification is dependent on the underlying data, and issues such as sparsity of data exist with each approach. By way of an example, comparing a distribution with sparse data with another distribution (having either dense or sparse data) can result in a false similarity. None of the existing approaches have been able to properly address the problem of sparsity in the underlying data used in distributional similarity determination. As such, each of the existing approaches is limited in its effectiveness (e.g., inaccuracies exist with the existing approaches measurements).

Given that user behavior (e.g., observed or detected user behavior) can include sparse amounts of data (e.g., observed user resource access requests), existing distributional similarity approaches are ineffective for use in an instruction detection system used to automatically detect computing system, network, etc. intrusions. The disclosed systems and methods address, among other things, inaccuracies in distribution similarity resulting from data sparseness issues. The disclosed systems and methods address data sparsity and improve over existing distribution similarity approaches. In accordance with embodiments of the present disclosure, randomized observations (e.g., randomly selected resource access requests) are added to real sample sets (each set comprising real observations, such as real resource access requests made by a user with a computing system) to generate perturbed sample sets which are then used to generate probability distributions for which a similarity measure is then determined.

The present inventors have determined that randomized observations added to a real sample set (comprising a number of real observations) improves the accuracy of a distributional similarity determination. With respect to a dense real sample set, the present inventors have determined that the addition of random samples does not negatively impact a distributional similarity measure determination made using a combination of the real and random sample sets. With respect to a sparse real sample set, the present inventors have determined that the addition of a random set of samples improves the distributional similarity measure's accuracy. These determinations demonstrate, among other things, that additional random samples can be added regardless of whether the real sample set is dense or sparse, and the use of the additional random samples achieves greater accuracy in the similarity determination.

The improvement provided by the presently disclosed systems and methods can be seen over existing approaches. By way of an example, the Jensen-Shannon and DICE methods were used with distributions consisting of only real observations, while distributions including both real and randomized observations were used with the Jensen-Shannon method. The outcome demonstrated that the addition of randomized observations resulted in improved accuracy.

According to some embodiments, the disclosed systems and methods receive a distributional similarity measurement request. The request identifies a pair of existing real sample sets, each comprising a set of real observations. For example, the pair real sample sets correspond to user activity with a computing system (e.g., an online service computing system, corporate system, etc.), each real sample set corresponds to a user and comprises a number of access requests (e.g., file access requests, service access requests, etc.) made by the user for a time period. Each instance of a resource access request in a real sample set is a detected real observation (behavior) of the user with the computer system being monitored by the intrusion detection system. The intrusion detection system is monitoring the user's resource access behavior (e.g., resource access requests). Each real observation is part of a domain, D, of possible observations (e.g., possible user behavior in the system being monitored). For example, domain, D, can comprise the possible types of resource access requests available in the computing system being monitored by the intrusion detection system.

The disclosed systems and methods then generate a random sample set for each existing real sample set received with the request. In accordance with at least one embodiment, each random sample set is generated by selecting a number, k, observations from the domain, D, of possible observations. By way of a non-limiting example, a number, k, resource requests can be randomly selected (or generated) from the domain, D, of possible types of resource access requests in order to generate each random sample set for each real sample set associated with the distributional similarity measurement request.

The disclosed systems and methods then generate a pair of perturbed sample sets. A first one of the perturbed sample sets is generated by combining one of the real sample sets associated with the received request and a first one of the random sample sets. The second perturbed sample set is generated by combining a second one of the real sample sets associated with the received request and a second one of the random sample sets.

The disclosed systems and methods then use each perturbed sample set to generate a corresponding probability distribution. In accordance with at least one embodiment, the number of occurrences (or a frequency of occurrence) associated with an observation (a real or a randomly-selected observation) in the perturbed sample set is used in determining a probability corresponding to the observation. For example, a type of access request (e.g., file access request) has a number of occurrences in a perturbed sample set, and each such occurrence is counted to determine a total number for the type of access request (e.g., a total number of file access requests in a perturbed sample set), which can be used to determine a probability associated with the type of access request (e.g., file access request).

The disclosed systems and methods then determine a similarity measure indicating a degree (or measure) of similarity between the pair of probability distributions generated using the two perturbed sample sets. In accordance with one or more embodiments, the similarity measure can be determined using the Jensen-Shannon (JS) divergence function (also referred to herein as the "JS" similarity). The disclosed systems and methods then return the determined similarity measure to the requester in response to the request. The similarity measure represents a distributional similarity for the pair of real sample sets.

In accordance with at least one embodiment, the disclosed systems and methods can use the distributional similarity for the pair of real sample sets to determine whether or not a user account has been compromised. For example, the similarity measure can be used to detect deviations in behavior associated with a user account. The intrusion detection system monitors user behavior, such as and without limitation, user requests for access to system resources (e.g., files, services, applications, etc.), and generates real sample sets comprising detected (or observed) resource access requests. For example, a real sample set can comprise resource access requests made by a user over a number of time periods (e.g., daily, weekly, monthly, etc.). The intrusion detection system can use the disclosed systems and methods to determine a similarity measure for a pair of real sample sets, each associated with a different time period and comprising observed resource access requests of the user for the time period.

The intrusion detection system can use the resulting similarity measure together with a similarity threshold to determine (in comparison with the threshold) whether the user's access patterns are similar (or consistent) for the two time periods. If the intrusion detection system determines that the access patterns are sufficiently dissimilar (e.g., as determined using a threshold), the system can take action to mitigate the risk (e.g., alert a system operator, freeze the user's account, etc.).

In accordance with one or more embodiments, the similarity threshold can be set based on a level of sensitivity to intrusion. For example, a high similarity threshold can correspond to a high sensitivity level and require that the user's behavior be quite consistent from one time period to the next. If the similarity measure for two time periods cannot satisfy the high similarity threshold, the user access pattern can be considered to be sufficiently dissimilar to cause alarm as well as a response (e.g., freezing the user account).

In accordance with some embodiments, the intrusion detection system can use the disclosed systems and methods to identify users having similar access patterns. Similar access patterns associated with a number of users can be combined to generate a combined real sample set. The combined real sample set can be paired with a user's real sample set representing the user's recent access requests in a given time period to determine a similarity measure which can be compared to a similarity threshold to determine if the user's resource access requests are consistent with the access patterns of the user group. If the determined similarity measure is sufficiently similar (e.g., the similarity measure satisfies the similarity threshold), the user is considered to be authentic (e.g., not a hacker masquerading as the user). Alternatively, if the determined similarity measure is sufficiently dissimilar (e.g., the similarity measure fails to satisfy the similarity threshold), the user account can be considered to be compromised, and appropriate action can be taken to mitigate the risk.

In addition to an intrusion detection application, the improved distribution similarity measurement provided herein can be used with a number of other applications. One such application involves determining a degree of similarity (e.g., consistency) in user purchase behavior over time (e.g., multiple users and a same time period, a single user and different time periods, etc.). By way of a non-limiting example, the user behavior involves user purchases (e.g., of products, goods, services, etc.), and the similarity measure can represent a measure of purchasing consistency. In accordance with some embodiments, the similarity measurement can be used by a consumer expenditure estimation system in communication or combination with the disclosed systems and methods.

As discussed in more detail herein, for various reasons, the observed behavior data associated with user purchases can result in real sample sets with sparse observations. The disclosed systems and methods improve similarity measurement's accuracy by adding additional random samples (e.g., additional random purchase amounts) to real observations of user purchasing behavior before generating the probability distributions used in measuring distributional similarity.

By way of a non-limiting example, real observations of user behavior involve a user's purchasing history, and the similarity measure may represent a purchasing consistency. Assuming, for the sake of the example, that a corpus of purchase data identifies the user's purchases for a number of months, e.g., the data for each purchase can include the date of purchase and the amount of the purchase. For a given month, the data corpus can be used to determine a probability distribution indicating a probability (or frequency) of purchase for each of a number of purchase amounts. Before determining a similarity for a pair of probability distributions associated with two different months of a user's purchases, a number, k, random purchases (e.g., purchase amounts) are added to each month's set of real purchases. Using k=10 as one non-limiting example, 10 randomly-selected dollar amounts (representing 10 additional, hypothetical purchases) are added to each month's set of real observations (e.g., real purchases). Then, a similarity measure is determined (e.g., a Jenson-Shannon similarity measure) representing the consistency of the user's purchases for the two months. The number of random values added to each month can vary, and may be determined empirically.

In the above example, the additional random values added to a real sample set that already has a dense set of observations does not negatively impact the similarity determination (e.g., quantification or measure). The addition of random values to a real sample set that has a sparse set of observations improves the similarity determination.

In the above example, the real sample sets in the above example can correspond to a single user—e.g., different periods of time, such as different months. In such a case, the similarity determination can indicate a level of consistency in the user's purchases.

In accordance with some embodiments, the distribution similarity measure response can be used by an information retrieval system (e.g., a Web search engine), natural language processing system, or other system interested in text classification and categorization. By way of a non-limiting example, terms (e.g., words) having similar probability distributions can be considered to have a similar meaning. However, some terms are much more frequently used than others, and the sparseness of data associated with some terms can result in erroneous semantic determinations. More particularly, terms that are less frequently used typically have corresponding sparse real sample sets and sparse probability distributions resulting in inaccuracies in the similarity determinations using such sparse probability distributions. The disclosed systems and methods improve the accuracy of measurement by adding random samples (e.g., additional random occurrences of terms in documents) to the real sample sets used to generate the probability distributions used in determining similarity.

As discussed above, the inventors have determined that additional random observations added to real sample set of observations that originally has a dense set of samples does not negatively impact the similarity determination (e.g., quantification or measure), and the addition of random samples to a real sample set that has a sparse set of samples improves the similarity determination. The disclosed systems and methods provide improved accuracy to the applications discussed herein and to other applications using probability distributions to measure similarity.

In accordance with one or more embodiments, a method is disclosed which includes receiving, at a computing device, a distributional similarity request identifying a pair of real sample sets, each real sample set of the pair comprising a number of real observations; determining, via the computing device, a pair of random sample sets for the pair of real sample sets, the determination comprising, for a random sample set of the pair, selecting a number of random observations from a domain of observations corresponding to the pair of real sample sets; determining, via the computing device, a pair of perturbed sample sets corresponding to the pair of real sample sets, a first perturbed sample set of the pair comprising a first one of the pair of real sample sets and a first one of the pair of random sample sets and a second perturbed sample set of the pair comprising a second one of the pair of real sample sets and a second one of the pair of random sample sets; determining, via the computing device, a pair of probability distributions corresponding to the pair of perturbed sample sets, a first probability distribution of the pair corresponding to the first perturbed sample set and comprising a probability for each of the number of real and random observations in the first perturbed set, a second probability of the distribution of the pair corresponding to the second perturbed sample set and comprising a probability for the each of the number of real and random observations in the second perturbed set; and automatically generating, via the computing device, a distributional similarity measure using the pair of probability distributions corresponding to the pair of perturbed sample sets, the distribution similarity measure representing a degree of similarity between the pair of real sample sets associate with distributional similarity request.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically measuring distributional similarity using randomized observations.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 5B:
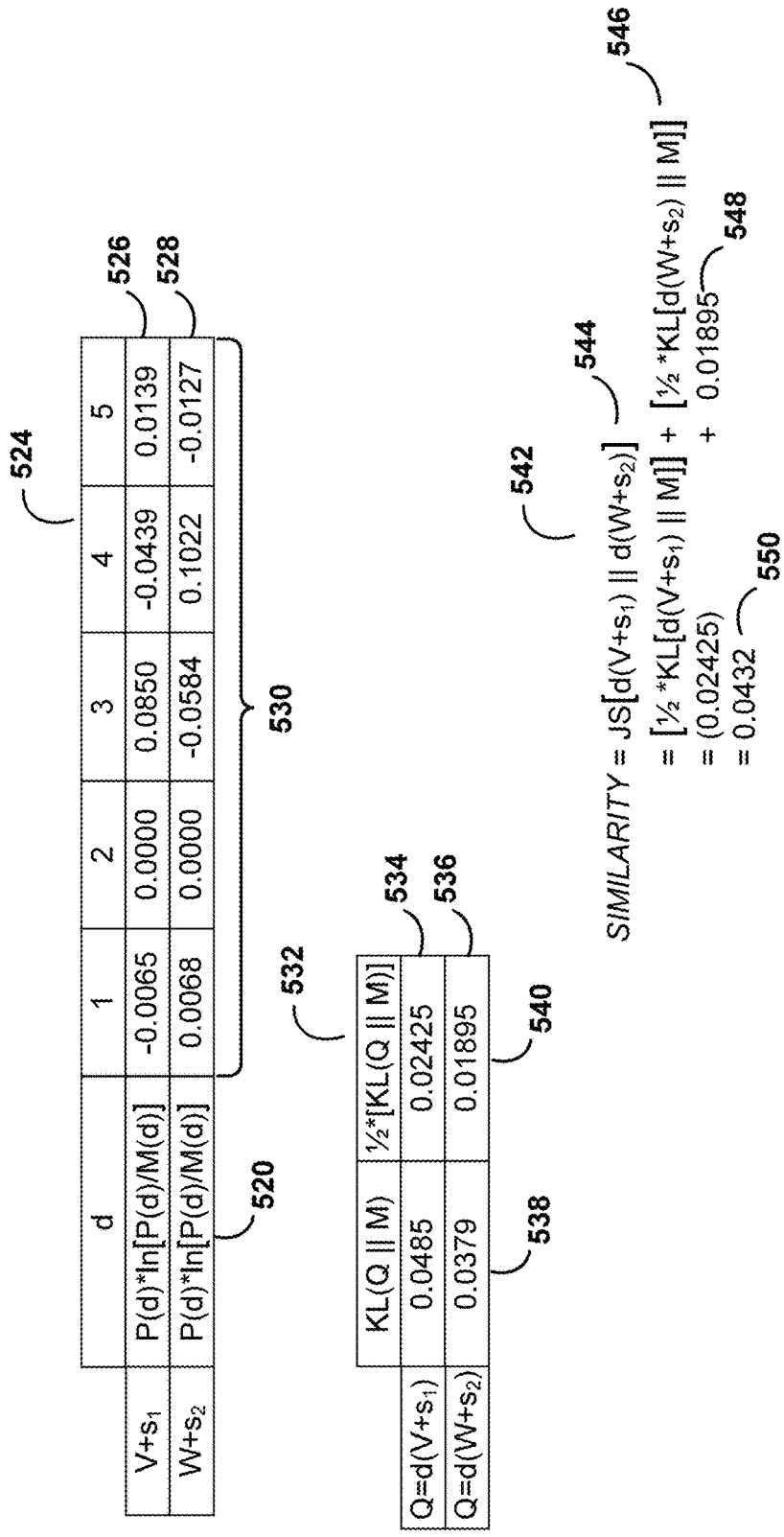
Figure 6:
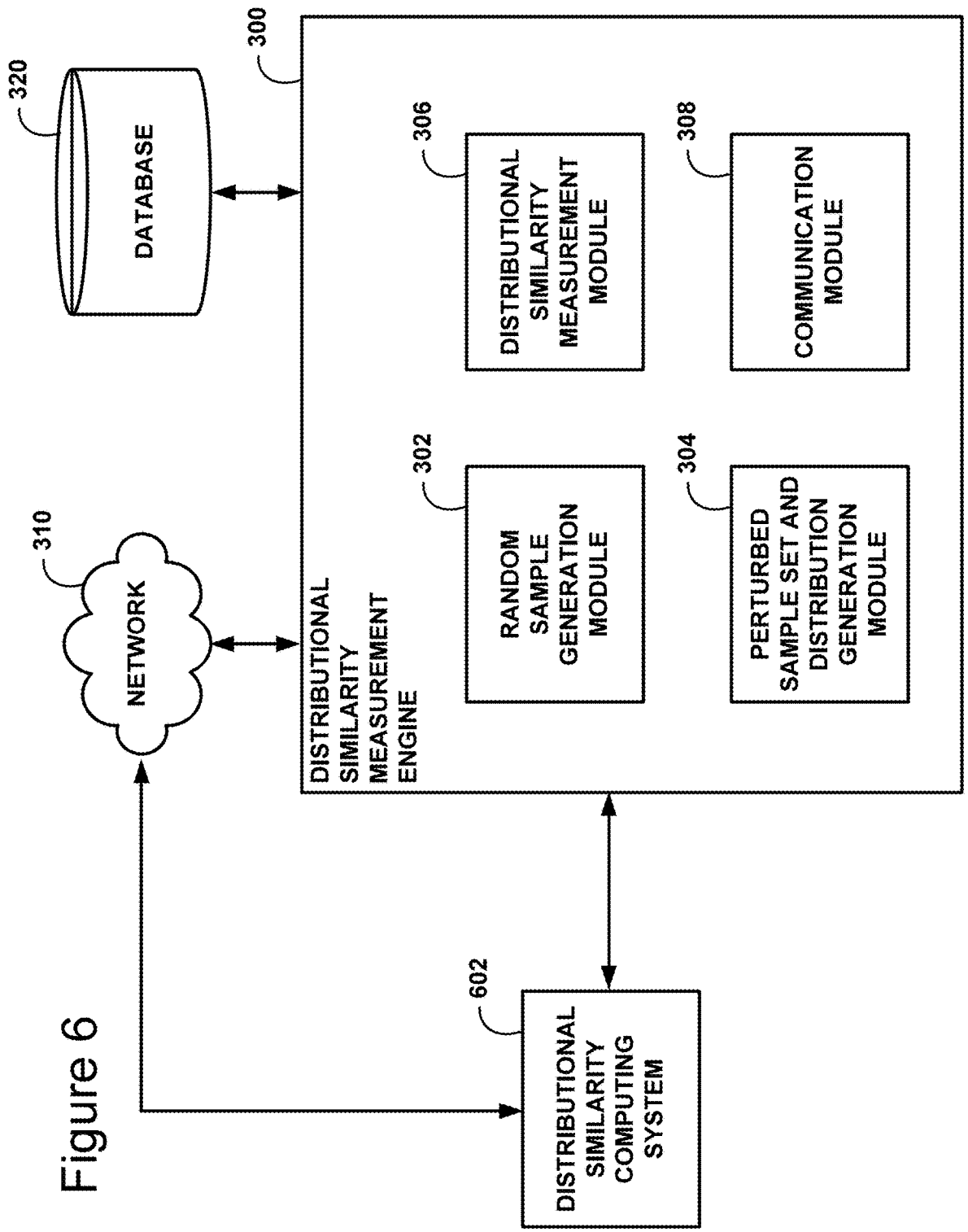
Figure 7:
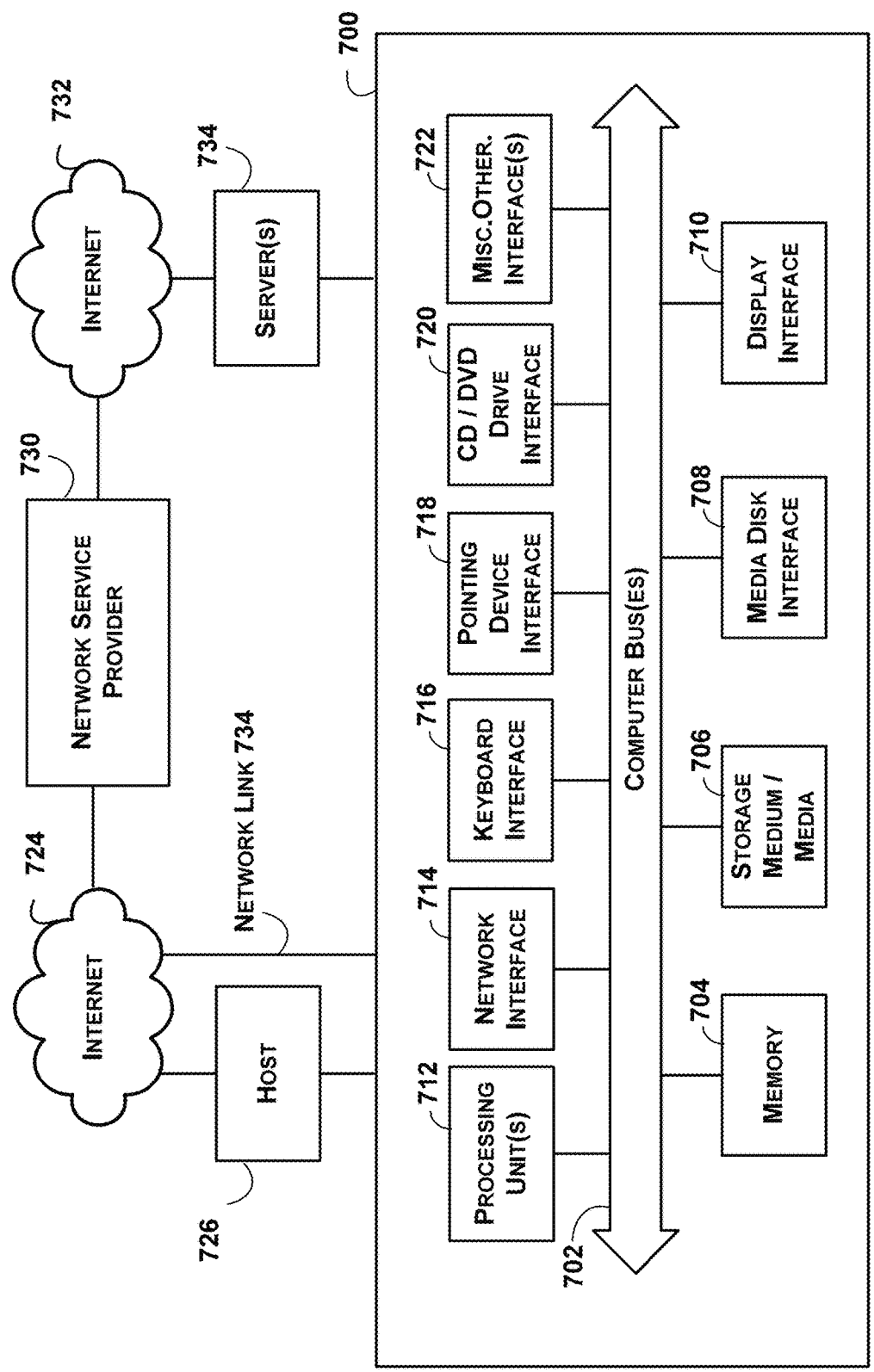

FIGS. 5A and 5B provide an exemplary example of a non-limiting embodiment in accordance with some embodiments of the present disclosure;

FIG. 6 is a diagram of an exemplary example of a non-limiting embodiment in accordance with some embodiments of the present disclosure; and FIG. 7 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The disclosed systems and methods provide a novel solution addressing the immediate demand for improved probability distribution similarity determinations for use by a computing system, such as intrusion detection systems. Other examples of such systems includes without limitation, consumer behavior analysis systems and text classification and categorization systems.

The present disclosure provides novel systems and methods for automatic distribution similarity identification using randomized observations. According to some embodiments, the disclosed systems and methods generate random observations in connection with two existing real sample sets (e.g., two sets of real observations). Each random sample set (of observations) comprising a number, k, randomly-generated (or randomly-selected) observations from a domain, D, of observations. The domain, D, also including the samples includes in the two real sample sets.

The disclosed systems and methods then generate two perturbed sample sets by combining a first one of the real sample sets with a first one of the random sample sets and combining a second one of the real sample sets with a second one of the random sample sets. The two perturbed sample sets are then used to generate two probability distributions and a similarity measurement is generated in a comparison of the two probability distributions.

Figure 1:
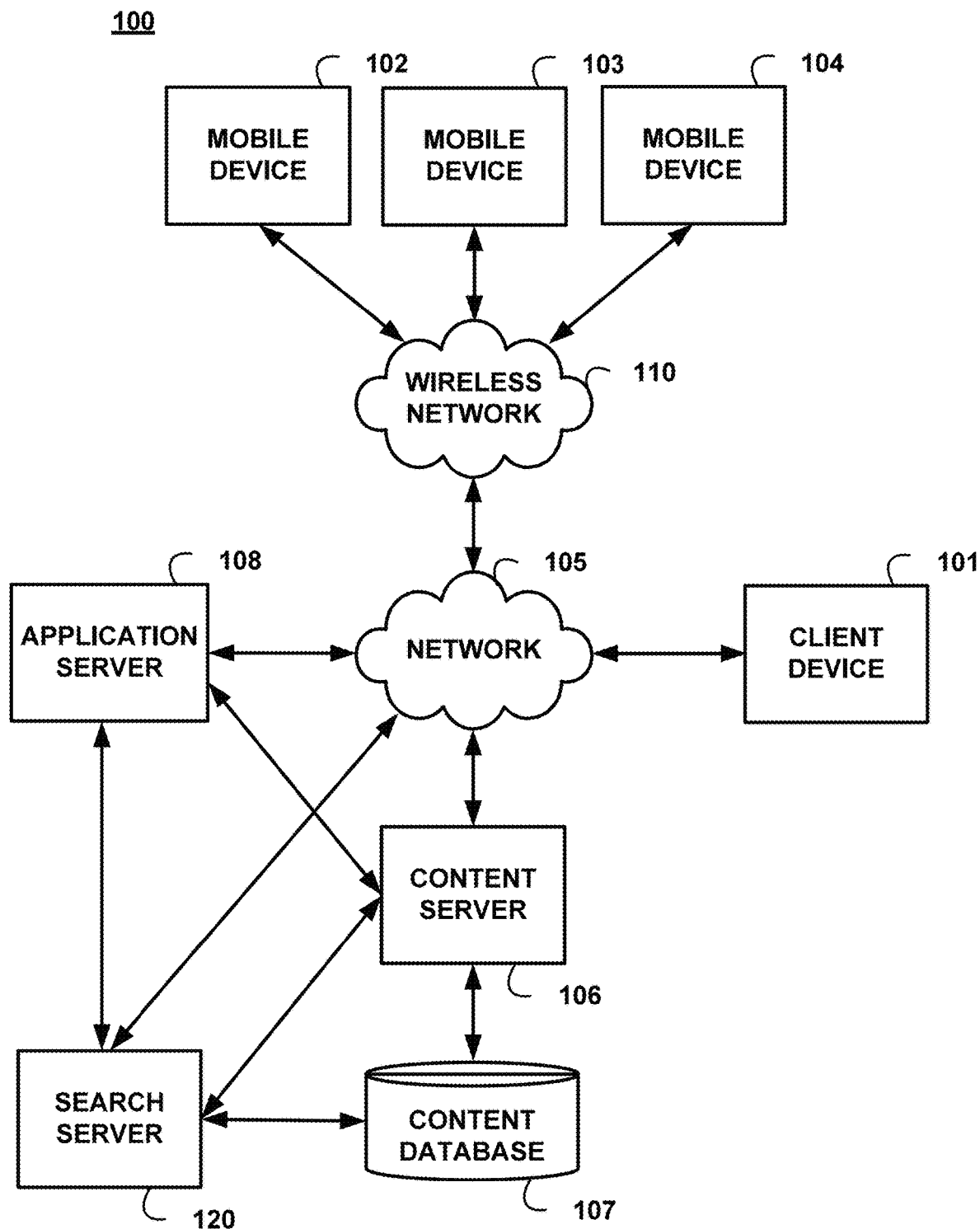
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior (s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below.

Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
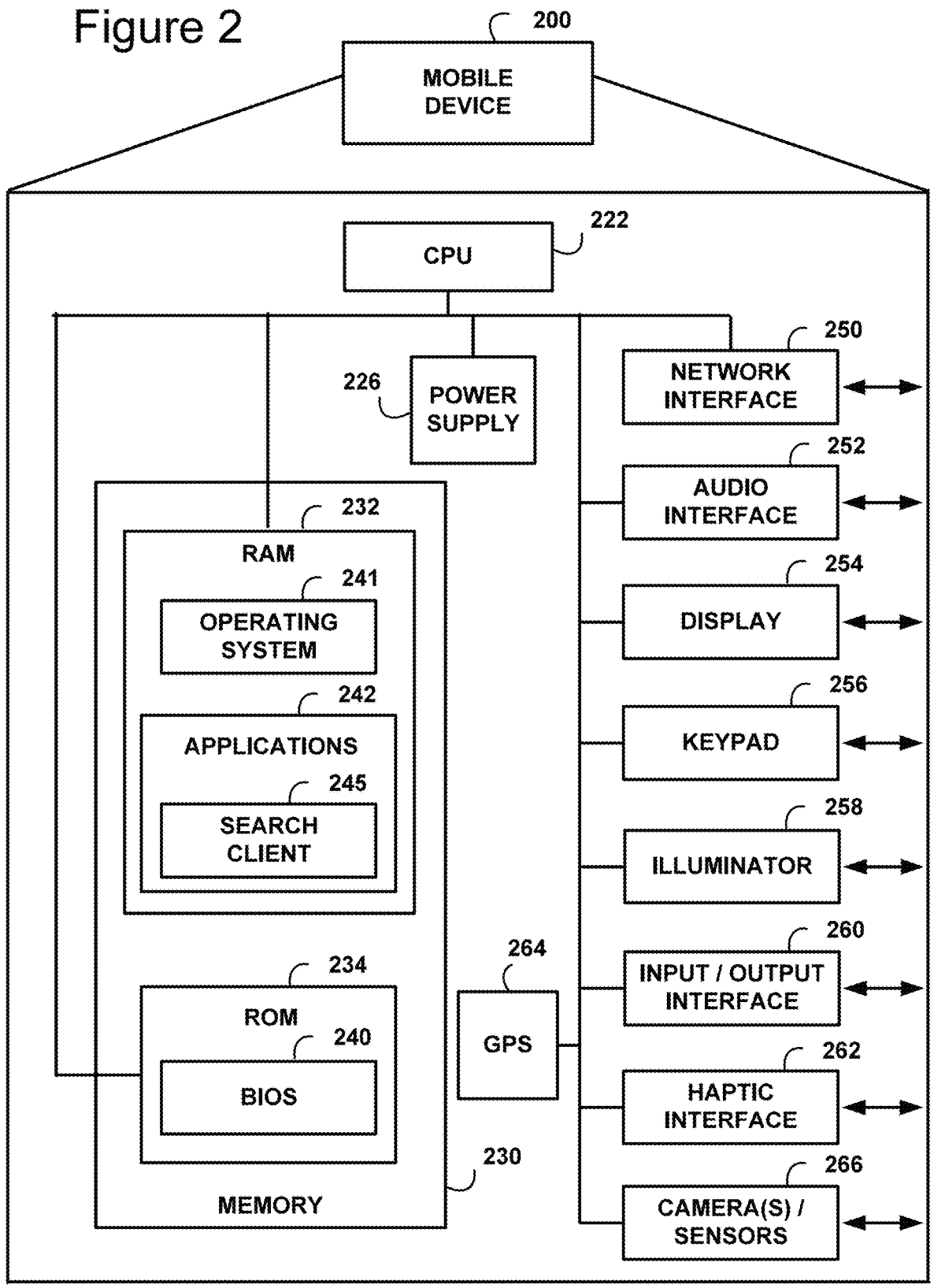
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
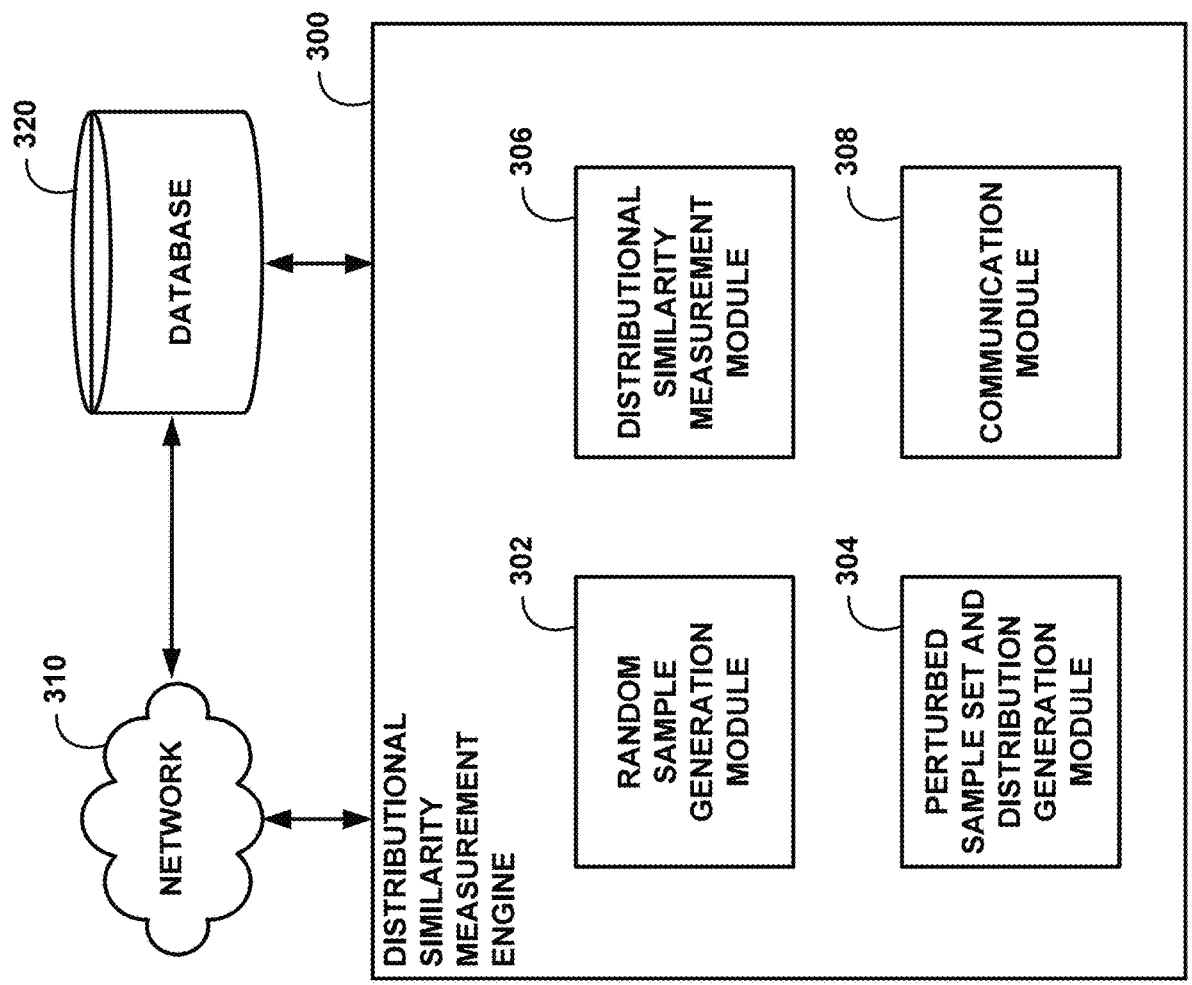
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a distributional similarity measurement engine 300, network 310 and database 320. The engine 300 can be a special purpose machine or processor and could be hosted by an application server, content server, social networking server, web server, search server, content provider, email service provider, ad server, user's computing device, and the like, or any combination thereof.

According to some embodiments, engine 300 can be embodied as a stand-alone application that executes on a user device. In some embodiments, the engine 300 can function as an application installed on the user's device, and in some embodiments, such application can be a web-based application accessed by the user device over a network.

The database 320 can be any type of database or memory, and can be associated with a content server on a network (such as and without limitation a content server, search server, application server, etc.) or a user's device. In some embodiments, database 320 comprises a set of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store sample sets (each comprising observations) used in generating a number of probability distributions. The sample sets can include real sample sets (each comprising a set of real observations), random sample sets (each comprising a set of randomly-selected observations), and perturbed sample sets (each comprising a combination of a real sample set and a random sample set). In accordance with one or more embodiments, each perturbed sample set can be used to generate a probability distribution which can be used with another probability distribution (generated using another perturbed sample set) in a distributional similarity determination made by engine 300.

By way of one non-limiting example, a real sample set corresponding to real observations stored in database 320 can comprise historical purchase information for a number of users. By way of another non-limiting example, database 320 can store other historical user behavior, such as and without limitation content selections (e.g., audio content, multimedia content, news articles, advertisements, etc.). The historical user behavior can comprise resource (e.g., files, services, etc.) requests by each of a number of users.

As yet another example, a real sample set corresponding to real observations stored in database 320 can comprise a number of terms and, for each term of the number, frequency information indicating the number of occurrences of the term in each document of a corpus of documents (which documents may also be stored in database 320). A real sample set corresponding to a term comprises information identifying the frequency of occurrence of the term in each document in the corpus of documents.

It should be apparent that the above examples are illustrative in nature, and that any type of real observation real sample sets can be stored in database 320. With respect to each real sample set and a corresponding random sample set, database 320 can include a domain, D, of possible, valid observations (each observation can be represented as, d) and a number, k, indicating the number of random observations selected for the corresponding random sample set that is to be combined with the real sample set to generate a perturbed sample set, which can also be stored in database 320.

The network 310 can be any type of network such as, but not limited to, a wireless network, a local area network (LAN), wide area network (WAN), the Internet, or a combination thereof. The network 310 facilitates connectivity of the engine 300, and the database of stored resources 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes random sample generation module 302, perturbed sample set and distribution generation module 304, distributional similarity measurement module 306, and communication module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by engine 300 can be supplied to the database 320 in order to ensure that the information housed in the database 320 is up-to-date as the disclosed systems and methods leverage real-time information during or responsive to distributional similarity measurement functionality, which functionality is discussed in more detail below.

Figure 4:
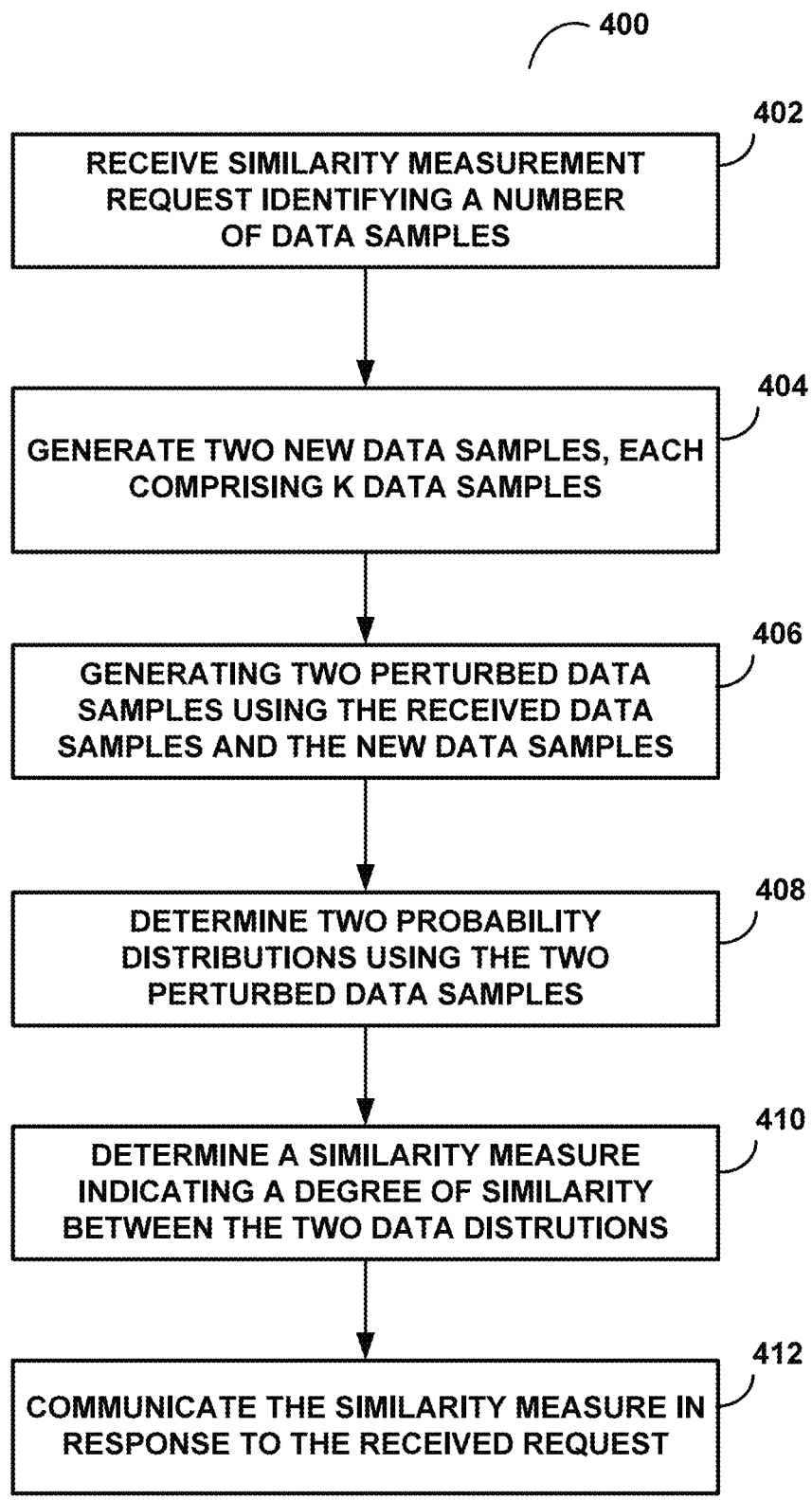
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically measuring distributional similarity for a pair of real sample sets using randomized observations. According to some embodiments, as discussed herein with relation to FIG. 4, the process involves determining a measure of similarity for a pair of real sample sets, each comprising a number of real observations (e.g., resource access requests made by a user to a computing system, etc.). A pair of random sample sets is generated, each random sample set comprising a number of random observations selected from a domain, D, of possible observations associated with the pair of real sample sets. By way of one non-limiting example, each random observation can be a resource access request randomly selected from the domain. Each randomly-selected observation (e.g., a randomly-selected resource access request) is not an actual observation (e.g., not an actual resource access request made by the user). Each randomly-selected observation is reflected in a random sample set. Each real (or actual) observation (a resource access request made by the user) is reflected in a real sample set.

A pair of perturbed sample sets is generated, each perturbed sample set corresponding to one of the real sample sets and comprising the number of real observations of the real sample set and the number of random observations from a corresponding random sample set. The pair of perturbed sample sets is then used to generate a pair of probability distributions. A probability distribution corresponding to one of the perturbed sample sets comprising a probability determined using each observation found in the perturbed set. The pair of probability distributions are compared to generate a measure (quantification, score, degree, level, etc.) of the similarity (or conversely the divergence) for the pair of probability distributions. The generated similarity measure also represents a measure of similarity for the pair of real sample sets.

At step 402, a distributional similarity measurement request is received by engine 300. The request identifies at least two real sample sets (e.g., a pair of real sample sets), each of which comprising a number of real observations. By way of a non-limiting example, the request can comprise a request to measure the similarity in user behavior observed in connection with one or more users across one or more time periods. In such a case, a real sample set can correspond to a user and a time period and the number of real observations (of the real sample set) include the observed user behavior for the user and time period.

In accordance with one or more embodiments, the user behavior comprises user computing system resource access requests made by the user and observed (e.g., detected) by an intrusion detection system. A real sample set, for a given user, can include information identifying each resource access request made by the user for a given time period.

To further illustrate, the request received at step 402 can be associated with a pair of real sample sets corresponding to user activity (or user behavior) with a computing system (e.g., an online service computing system, corporate system, etc.), each real sample set corresponds to a user and comprises a number of access requests (e.g., file access requests, service access requests, etc.) made by the user for a time period. Each instance of a resource access request in a real sample set is a detected real observation (behavior) of the user with the computer system being monitored by the intrusion detection system. The intrusion detection system is monitoring the user's resource access behavior (e.g., resource access requests). Each real observation is part of a domain, D, of possible observations (e.g., possible user behavior in the system being monitored). For example, domain, D, can comprise the possible types of resource access requests available in the computing system being monitored by the intrusion detection system.

As yet another non-limiting example, in accordance with at least one embodiment, the user behavior can comprise purchase transaction information, and the real sample set corresponding to a user can comprise a number of observations of the user's actual purchases.

In accordance with one or more embodiments, the request received at step 402 can comprise a request to measure the semantic similarity between at least two terms, and the real sample set can correspond to a term and include information identifying the number of occurrences of the term in each document in a corpus of documents.

At step 404, which is performed by random sample generation module 302, a random sample set is generated for each real sample set associated with the request received at step 402. In accordance with at least one embodiment, a domain, D, of possible observations is associated with the real sample sets. Each random sample set comprises a number of randomly-selected observations selected from the domain of possible observations. By way of a non-limiting example, a number, k, observations (or samples) can be randomly selected (or generated) from the domain, D, of possible observations in order to generate a random sample set for each real sample set associated with the received request.

To illustrate further, assume that the at least two real sample sets associated with the request received at step 402 comprise a pair of real sample sets, each of which corresponds to resource access requests made by a particular user in a given time frame. In addition, assume that the domain, D, comprises possible types of access requests (e.g., file access requests, service requests, etc.), and the number, k, random observations equals 10. For each real sample set, 10 random access requests are generated from the domain. D, where each randomly-selected access request is selected from the domain, D, of possible types of access requests.

In accordance with at least one embodiment, the number, k, of random observations can vary and may be determined based on the number of possible observations in a given domain, D, associated with the real sample sets. A larger domain might warrant a larger value of k, and vice versa, for example. The value of k can be determined empirically based on a desired level of accuracy.

In accordance with at least one embodiment, the number, k, resource requests can be randomly selected (or generated) from the domain, D, of possible types of resource access requests in order to generate (at step 404) each random sample set for each real sample set associated with the distributional similarity measurement request.

In accordance with one or more other embodiments, assume that D represents a domain of possible user purchases each represented by its dollar value (among other information), and the domain, D, comprises a set of real numbers in the range of $0.00 to $1,000.00. In addition, assume that the at least two real sample sets correspond to different months and each of the at least two real sample sets comprises information indicating the dollar amount of each of a number of purchases made by a user in a respective one of at least two months. Finally, assume that the number, k, of is equal to 10. Using this example, a random sample set can be generated by randomly selecting 10 dollar amounts (or random observations) from the domain, D, such that the 10 randomly-selected amounts are in the range of $0.00 to $1,000.00. A random sample set can be determined in this manner for each of the at least two real sample sets.

As yet another example, assume that each of the at least two real sample sets associated with the request received at step 402 corresponds to a term occurring in a corpus of documents. In addition, assume that the domain, D, comprises the documents belonging to the corpus of documents, and that the number, k, of random observations equals 100. Using this example, for each real sample set, 100 random observations are generated from the domain, D, where each random observation indicates a document from the corpus of documents.

At step 406, which is performed by perturbed sample set and distribution generation module 304, a perturbed sample set is generated for each of the real sample sets associated with the request received at step 402. In generating a perturbed sample set, a real sample set is combined with one of the random sample sets generated at step 404, such that each perturbed sample set comprises the number of real observations of the real sample set and the number of random observations of one of the random sample sets generated at step 404.

In accordance with at least one embodiment, a real sample set comprising a user's actual resource access requests (e.g., for a given time period) is combined with a random sample set comprising randomly-selected (non-existent) resource access requests (randomly selected from the domain, D, of possible resource access requests) to generate a perturbed set of access requests corresponding to the user.

As a result, at least a pair of perturbed sample sets is generated at step 406. A first one of the perturbed sample sets is generated by combining one of the real sample sets associated with the received request and a first one of the random sample sets. The second perturbed sample set is generated by combining a second one of the real sample sets associated with the received request and a second one of the random sample sets.

In accordance with at least one embodiment, the real sample sets can correspond to observed user purchases and each real sample set comprises the dollar amounts of each of a user's actual purchases (for a given time period). At step 406, a real sample set can be combined with a random sample set comprising a number, k, dollar amounts (each representing a non-existent) purchase to yield a perturbed sample set comprising the number of real and random dollar amounts associated with the user and a given time period.

In accordance with one or more embodiments, at step 406, a real sample set comprising a term's actual document occurrences can be combined with a random sample set comprising a number, k, non-existent occurrences of the term in documents of a corpus of documents resulting in a perturbed set of document occurrences associated with a term.

At step 408, which is performed by perturbed sample set and distribution generation module 304, a probability distribution is generated for each perturbed sample set. In accordance with at least one embodiment, the number of occurrences (or a frequency of occurrence) associated with an observation in the perturbed sample set is used in determining a probability corresponding to the observation. For example, a type of access request (e.g., file access request) has a number of occurrences in a perturbed sample set, and each such occurrence (which can be either a real observation or a randomly-selected observation) is counted to determine a total number for the type of access request (e.g., a total number of file access requests in a perturbed sample set), which can be used to determine a probability associated with the type of access request (e.g., file access request).

In accordance with at least one embodiment, a probability associated with a given d (from domain, D) in a perturbed set can be determined using one or more random-selected instances of d randomly selected for inclusion in the random sample set used to generate the perturbed set. Similarly, the probability of each d (from domain, D) determined using a total number of observations from the perturbed set can be determined using a number of randomly-selected observations randomly selected for inclusion in the random sample set used to generate the perturbed sample set.

Referring again to step 406, a perturbed sample set of access requests corresponding to the user can be used to generate a probability distribution associating a probability with an access request type (a d from domain, D) indicating the probability of the resource access request. In accordance with some embodiments of the disclosure, a probability can be determined using a frequency of occurrence of a given resource access request type, as is discussed in more detail below.

In accordance with one or more embodiments, a perturbed sample set of purchases associated with the user and a given time period can be used to generate a probability distribution associating a probability with a purchase amount in the domain, D, purchase amount values, where the probability represents the probability of a dollar-amount purchase by the user.

In accordance with at least one embodiment, a perturbed sample set of document occurrences associated with a term can be used to generate a probability distribution associating a probability of the term in connection with each document, where the probability associated with a document indicating the probability of the term's occurrence in the document.

At step 410, a similarity measure is determined using a pair of probability distributions, each of which is generated using a perturbed sample set. In accordance with at least one embodiment, a Jensen-Shannon similarity measurement can be generated using the pair of probability distributions. The generated similarity measure represents a measure of similarity for the pair of real sample sets associated with the request received at step 402.

FIGS. 5A and 5B provide an exemplary example of a non-limiting embodiment in accordance with some embodiments of the present disclosure. In the example 500 shown in FIGS. 5A and 5B, d, represents an observation in domain, D. For the sake of simplicity, domain, D, comprises observations corresponding to data values 1-5, each of which is represented by, d. In Table 502 (of FIG. 5A), V and W are real sample sets comprising a number of actual (or real) observations (e.g., from domain, D), each observation of the number in each of the real sample sets representing an actual, observed occurrence of an observation in domain, D.

In Table 504 (of FIG. 5A), $s_1$ and $s_2$ are first and second random sample sets comprising a number, k, random observations, each of which is a value randomly selected from domain, D. In accordance with at least one embodiment, a first perturbed sample set, $V+s_1$, comprises real sample set, V, and random sample set, $s_1$, and a second perturbed sample set, $W+s_2$, comprises real sample set, W, and random sample set, $s_2$. In example 500 shown in FIGS. 5A and 5B, the probabilities associated with the observations associated with each perturbed set are intended as examples only.

In accordance with at least one embodiment, the perturbed sample sets, $V+s_1$ and $W+s_2$, are used in place of the real sample sets, V and W (which represent the actual observations), in determining the similarity for samples sets, V and W. In accordance with at least one embodiment, the similarity determination is determined using the two perturbed sample sets, $V+s_1$ and $W+s_2$, and a similarity measurement, which can be represented as follows:

$$\text{Similarity} = \text{Divergence}(d(V+s_1) \| d(W+s_2)), \quad \text{Expr. (1)}$$

where ∥ is a divergence operator, $d(V+s_1)$ and $d(W+s_2)$ are probability distributions corresponding (respectively) to the perturbed sample sets, $V+s_1$ and $W+s_2$, and Divergence is a divergence function, such as the Jensen-Shannon divergence function. Using Jensen-Shannon as the divergence function, Expression (1) can be expressed as follows:

$$\text{Similarity} = [\tfrac{1}{2} * KL[d(V+s_1) \| M]] + [\tfrac{1}{2} * KL(d(W+s_2) \| M)], \quad \text{Expr. (2)}$$

where ∥ is the divergence operator, KL corresponds to the Kullback-Leibler divergence function, and M is an average of the probability distributions determined using the perturbed sample sets ($V+s_1$ and $W+s_2$), and M can be expressed follows:

$$M = \tfrac{1}{2} * [(d(V+s_1) + d(W+s_2)] \quad \text{Expr. (3)}$$

Referring again to Expression (2), the portion to the right of the equals sign comprises two sub-expressions, each of which results in a value (corresponding to one of the perturbed sample sets). The resulting two values are summed to yield a result for Expression (2). The first sub-expression can be used to determine the Kullback-Leibler divergence between M and $d(V+s_1)$, and the second sub-expression can be used to determine the Kullback-Leibler divergence between $d(W+s_2)$ and M. Each sub-expression can be expressed as follows:

$$KL(Q \| M) = \Sigma_{d \in D} Q(d) * \ln(Q(d)/M(d)), \quad \text{Expr. (4)}$$

where Q represents either $d(V+s_1)$ or $d(W+s_2)$, d is a value from domain, D, P(d) is the probability associated with d in probability distribution, Q (which represents either probability distribution $d(V+s_1)$ or probability distribution $d(W+s_2)$), and M(d) is the probability associated with d in M, the average probability distribution determined using probability distributions $d(X+s_1)$ and $d(Y+s_2)$ (e.g., determined using Expression (3)).

In accordance with some embodiments, P(d) (e.g., the probability of d) can be determined using the frequency of occurrence of d in a perturbed sample set. By way of an example, assuming (as is the case in the example shown in FIGS. 5A and 5B) that the interval width associated with d is one (e.g., interval width=$d_2 - d_1 = 1$), then the probability of d, P(d), in a given perturbed data set can be determined to be the number of occurrences (or frequency of occurrence) of d in the perturbed sample set divided by the total (sum or aggregate) of the number of occurrences (or frequencies of occurrence) of all of the d's in the perturbed set multiplied by the interval (which is equal to 1 in this example).

In accordance with at least one embodiment, the result of Expression (2) provides a measure (or quantification) of the degree to which the probability distributions $d(V+s_1)$ and $d(W+s_2)$ are similar. In addition, the result of Expression (2) provides a measure of the degree to which the probability distribution d(V) and d(W) are similar. The determined similarity measure also represents a degree of similarity for the pair of real sample sets, V and W. By way of one example, the smaller the similarity measure the more similar the probability distributions (and the real sample sets) and, conversely, the larger the measure's value the more the probability distributions (and the real sample sets) differ.

In example 500, Table 506 (of FIG. 5A) includes columns 518 corresponding to each d (e.g., five values) from domain, D. In Table 506, rows 508 and 510 correspond to the real sample sets V and W, and each occurrence of d has a corresponding probability, P(d), in each of real sample sets (e.g., V and W). Similarly, rows 510 and 512 correspond to the perturbed sample sets, $V+s_1$ $W+s_2$, and each occurrence of d has a corresponding probability, P(d), in each of two perturbed sample sets (e.g., $V+s_1$ $W+s_2$). The probability, P(d), for a given d in each sample set (real or perturbed sample set) can be determined using the frequency of occurrence of d in the sample set, as discussed above. As discussed herein, the probabilities used in Table 506 are intended as examples only.

In example 500, Table 506 (of FIG. 5A) includes row 516 corresponding to the average probability distribution, M, comprising an average probability for each d. In accordance with at least one embodiment, the average associated with a given d can be determined using Expression (3).

Table 524 (of FIG. 5B) includes, for each d, a value determined using the sub-expression, Q(d)*ln(Q(d)/M(d)), from Expression (4). Column 520 of Table 524 illustrates the expression used, for each value of d, to determine the values in columns 530 of rows 526 and 528. The values in columns 530 of row 526 (corresponding to the $V+s_1$ perturbed sample set) are determined using corresponding P(d) values from columns 518 of row 512 and corresponding M(d) values from columns 518 of row 516 of Table 506 (of FIG. 5A). Similarly, the values in columns 530 of row 528 (corresponding to the $W+s_2$ perturbed sample set) are determined using corresponding P(d) and M(d) values from columns 518 and rows 514 and 516 of Table 506 (of FIG. 5A).

Column 538 of Table 532 (of FIG. 5B) corresponds to the sub-expression, KL (d $(V+s_1)$|M), from Expression (4), where the value in column 538 of row 534 is the result of summing (or aggregating) the values in columns 530 of row 526 of Table 524 (of FIG. 5B), and the value in column 538 of row 536 is the result of summing (or aggregating) the values in columns 530 of row 528 of Table 524. The values in column 538 of rows 534 and 536 of Table 532 are divided by two to yield the values in column 540, rows 534 and 536 Table 532.

In sub-example 542 of example 500 (shown in FIG. 5B), row 544 illustrates Expression (1), which uses Jensen-Shannon as the similarity (or divergence) function to determine a similarity in example 500. Using Expression (2), row 544 can be alternately expressed as shown in row 546 of sub-example 542. As shown in row 548 in sub-example 542, the values in column 540, rows 534 and 536 of Table 532 correspond to the left-hand and right-hand sides of expression 546. And, as shown in row 550 of sub-example 542, the sum of the values in column 540, rows 534 and 536 of Table 532 yields the Jensen-Shannon similarity (or divergence) measure indicating the degree of similarity (or the degree of divergence) of the two probability distributions, $d(V+s_1)$ and $d(W+s_2)$, which also represents the degree of similarity (or the degree of divergence) of the two real sample sets, V and W.

Referring again to FIG. 4, at step 412 (which is performed by communication module 308), the similarity measurement is returned to the requester in response to the request received at step 402. In accordance with at least one embodiment, the requester is the intrusion detection system making the request at step 402.

In some of the examples used above, a Jansen-Shannon similarity is used in determining a measure of similarity between probability distributions. It should be apparent that other measures of similarity may also be used. Beneficially, the disclosed systems and methods provide a measure of similarity between distributions, which can be used to represent a measure of similarity between a pair of real sample sets. The disclosed systems and methods increase the accuracy of the similarity measure by addressing sparsity in the observations for which the similarity measure is being determined. In many cases, there are diverse levels of observations, which is addressed using the disclosed systems and methods. The disclosed systems and methods can be used by a number of systems that use distributional similarity measures.

FIG. 6 is a diagram of an exemplary example of a non-limiting embodiment in accordance with some embodiments of the present disclosure. In the example shown in FIG. 6, computing system 602 transmits the request received by engine 300 at step 402 (of FIG. 4) and receives the similarity measure (corresponding to a pair of real sample sets) transmitted by engine 302 at step 412 (of FIG. 4). In the example shown in FIG. 6, engine 300 and system 602 are shown as separate components. It should be apparent that engine 300 or some or all of the modules of engine 300 can be combined with system 602.

In accordance with one or more embodiments, system 602 can comprise an intrusion detection system implemented by one or more computing systems (e.g., a number of server computers and/or other computing devices). The intrusion detection system can monitor user behavior, such as and without limitation, user requests for access to system resources (e.g., files, services, applications, etc.), and generate real sample sets comprising detected (or observed) resource access requests. For example, a real sample set can comprise resource access requests made by a user over multiple time periods (e.g., daily, weekly, monthly, etc.).

In accordance with some embodiments, the intrusion detection computing system using a number of distributional similarity measures to identify a compromised user account that has access to a computing system (e.g., one or more server computers providing an online service, a number of computer systems operating on a corporate network, etc.). One example of an intrusion that is desirable to detect and act upon involves a hacker who masquerades as a legitimate user after obtaining that user's credentials.

In accordance with at least one embodiment, the intrusion detection system (as system 602) uses a distributional similarity measure provided by engine 300 to identify an inconsistency in user behavior from one period to the next. The distributional similarity measures provided by engine 300 and determined using user behavior information can be used by the intrusion detection system (as system 602) to identify atypical behavior associated with a user account. If atypical behavior is detected by system 602 with respect to a user account, system 602 can take steps to mitigate the damage or danger, such as freezing the user account so that it is not available to a hacker.

Users can be very diverse both in terms of the resources they use and in terms of the frequency in which they use resources. Therefore, the problem of identifying similar and dissimilar access patterns illustrates a sparse distributional similarity problem discussed herein. By better measuring similarity, the disclosed systems and methods implemented by engine 300 can reliably detect similarity (or dissimilarity, and by using fewer actual observations. Advantageously, the period in which a masquerader can act maliciously can be reduced.

In accordance with one or more embodiments, activity of users accessing a computing system (e.g., online service, corporate system, etc.) is monitored by the intrusion detection system (as system 602). Examples of user activity that can be monitored includes access (or requests for access) to electronic resources (files, services, etc.). System 602 then uses the observed user behavior (for at least two real sample sets) to request one or more distributional similarity measures from engine 300. Engine 300 uses the real sample sets associated with the request to determine and respond with at least one similarity measure, in accordance with at least one embodiment of the systems and methods disclosed herein.

In accordance with one or more embodiments, the intrusion detection system can use a distributional similarity measure together with a similarity threshold to determine (in comparison with the threshold) whether the user's access patterns are similar (or consistent) over the multiple time periods. If the intrusion detection system determines that the access patterns are sufficiently dissimilar (e.g., as determined using a threshold), the system can take action to mitigate the risk (e.g., alert a system operator, freeze the user's account, etc.).

In accordance with one or more embodiments, the similarity threshold can be set based on a level of sensitivity to intrusion. For example, a high similarity threshold can correspond to a high sensitivity level and require that the user's behavior be quite consistent from one time period to the next. If the similarity measure for two time periods cannot satisfy the high similarity threshold, the user access pattern can be considered to be sufficiently dissimilar to cause alarm as well as a response (e.g., freezing the user account).

In accordance with at least one embodiment, as an intrusion detection system (e.g., system 602) can use the similarity measures associated with users (determined using engine 300) to group together users with similar access patterns. In accordance with at least one embodiment, each group can have a real sample set which can be a combination of each group member's accesses.

Intrusion detection system can continue to monitor a user's accesses, transmit a distributional similarity request to engine 300 in connection with a pair of real sample sets comprising the group's real sample set (e.g., a set of resource requests of the group of users, such as a set of the past or most recent access requests of the group of uses, etc.) and the user's access requests (e.g., the user's most recent resource access requests). The pair of real sample sets can be used by engine 300 to determine and return a distributional similarity measure. Intrusion detection system can use the returned distributional similarity measure received from engine 300 to determine whether the user's recent accesses deviate (e.g., sufficiently dissimilar) from the group's access patterns.

The distribution similarity measure determined by engine 300 using the combined real sample set (of a group of users determined to have similar resource access requests) and a user's real sample set representing the user's recent access requests in a given time period (as the pair of real sample sets) can be used to determine a similarity measure which can be compared to a similarity threshold to determine if the user's resource access requests are consistent with the access patterns of the user group. If the determined similarity measure is sufficiently similar (e.g., the similarity measure satisfies the similarity threshold), the user is considered to be authentic (e.g., not a hacker masquerading as the user). Alternatively, if the determined similarity measure is sufficiently dissimilar (e.g., the similarity measure fails to satisfy the similarity threshold), the user account can be considered to be compromised, and appropriate action can be taken to mitigate the risk.

In accordance with at least one embodiment, a similarity threshold using by the intrusion detection system can represent a level of dissimilarity (or a level of deviation) at which some action is to be taken. For example, the similarity measure received by the intrusion detection system (from engine 300) can be compared with the deviation threshold, and action might be taken if the similarity measure satisfies the level of deviation (e.g., the level of similarity is at least as dissimilar as the threshold). In a case that the similarity measure is at least as dissimilar as the threshold amount (e.g., satisfies the level of deviation indicating atypical user access behavior), the user's access pattern can be considered to deviate enough from the common pattern associated with the user's group to take action (e.g., freeze the user's account until it can be determined whether or not the user account has been compromised).

In accordance with some embodiments, system 602 can be a consumer expenditure estimation system which evaluates consumer expenditures by tracking transactions (e.g., purchases of products, services, goods, etc.). As a consumer expenditure system, system 602 can be associated with one or more entities (e.g., companies) that mediate purchase transactions (e.g., a credit card company), collect receipts for purchase transactions (e.g., an electronic messaging service provider), a large general purpose retailer (e.g., an online retailer, brick-and-mortar, hybrid, etc.). One or more of these entities, companies, etc. may wish to evaluate the total expenditure or the relative expenditure level of a consumer.

In reality, however, no one entity has a full view of a consumer's expenses. A consumer may use multiple credit cards, debit cards, checking accounts, cash, etc. In addition, electronic messaging receipts may not completely capture the consumer's purchasing behavior. For example, a consumer may make a number of purchases with outlets which do not send e-mail receipts. Furthermore and although a big retailer may process a large portion of a consumer's purchases, there are likely other purchases that a consumer makes elsewhere.

Thus, each entity monitoring a user purchasing behavior can have a different level of actual user purchase behavior observations. This makes it difficult to measure user behavior similarity for a single user in different time periods as well as measuring the similarity of user behavior in multiple, different users.

System 602 can use engine 300 and the disclosed systems and methods implemented by engine 300 to effectively compare real sample sets (e.g., each comprising real purchasing information observed in connection with a given user and time period) even though they likely have varying levels of purchasing user observations. The disclosed systems and methods provide a greater accuracy in identification of similarity, which allows for better differentiation of users who exhibit consistent expenditure patterns from those who do not. The probability distributions generated using a perturbed sample set provide an increased capability in identifying consistent user behavior, and such capability is valuable to system 602.

In some embodiments, system 602 can provide advertising content to user computing devices using an electronic communications network, such as the internet. System 602 can use engine 300 and user purchases to identify consistent (or inconsistent purchasing behavior of a user, or users). For example, it might be of interest to an advertiser supplying advertising content to system 602 to identify those users having a consistent interest in a product, or products, being advertised. In this case, system 602 can request that engine 300 take real sample sets comprising actual observations of a user's purchases over a number of months. The similarity measures provided by engine 300 can be used by system 602 to discern whether the user's interest in a product is consistent or inconsistent. For example, the user's purchases of a given product for the two most recent months can be used by engine 300 to identify a measure of distributional similarity, which can be used by system 602 to identify (e.g., when compared to a similarity threshold) whether or not the user's interest in the product is consistent for different time periods. For example a similarity measure that satisfies a threshold similarity can indicate that the user has a consistent level of interest in a given product.

By way of another non-limiting example, system 602 may wish to differentiate users based on purchasing power (e.g., upper-middle class, lower-middle class, etc.) in order to provide content advertising products suited to a user's purchasing power. For example, system 602 may train a model using a machine learning algorithm to identify a user's purchasing power. In the case of supervised learning, the training data used to train the model can comprise a number of training examples comprising features and a label identifying a purchasing power. Each training example can be associated with a user whose purchases are known to system 602. The features included in a training example can comprise features known about the user and a label identifying the user's purchasing power. The features may include, for example, age, gender, address information indicating a geographic location of the user, etc.

Using similarity measures provided by engine 302, system 602 can filter users according to each user's month-to-month similarity in their purchase distributions. Users with similar month-to-month purchase distributions can be selected over users with less consistency for purposes of training the model. In so doing, for example, the labels associated with the training examples can be more accurate and the model's prediction can be more meaningful. The selected users can be grouped according to purchase power based on the amounts of each user's purchases. Training examples can then be generated by system 602 and used by system 602 to train the model. Once trained, the model can be used by system 602 to identify a user's purchasing power using features of a user as input to the model. System 602 can then use the user's determined purchasing power to select a number of advertisements, each of which can advertise a product, service, etc. with an associated purchase price that is in accordance with the user's determined purchasing power.

In accordance with some embodiments, system 602 can be a text classification and categorization system which groups together terms with similar meaning (also referred to as aggregating, clustering or reducing the dimension).

One example approach of grouping of terms is called agglomerative information bottleneck. With this approach, terms are represented by their real sample set, which, for each term, is the number of times the term occurs in each document out of a given a corpus of documents. Then, a pair of terms whose real sample sets are determined to be the most similar are grouped as one term. This new term (formed by grouping the pair of terms) is then represented by a combination of their corresponding real sample sets, and another round of the process of identifying and combining similar terms can be performed.

Because some terms are much more frequently used than others, the agglomerated information bottleneck method, and similar distributional language analysis methods, all must address sparsity. This is the context in which methods such as the DICE normalization methods of measuring distributional similarity have been developed. However, the present inventors have determined that the disclosed systems and methods are much more capable at addressing sparsity than any other method, including the DICE methods. That is, the disclosed systems and methods have been found to provide more accurate similarity measures than other approaches, including the DICE methods. This finding applies to any application, including text classification and categorization and determining the semantic meanings of terms.

The process of grouping terms can be improved using the disclosed systems and methods. In accordance with at least one embodiment, each real sample set corresponding to a term and identifying the number of times the term occurs in each document of a corpus of documents can be combined with a random sample set to generate a perturbed sample set, as discussed herein. A pair of perturbed sample sets corresponding to a pair of terms can be used to generate a pair of probability distributions, and a measure of distributional similarity can be determined using the pair of probability distributions. If the measure of distributional similarity indicates a sufficient (e.g., a threshold) level of similarity for the two terms to be considered to have a similar meaning, the real sample sets associated with the two terms can be combined. Then, the resulting real sample set combination can be used to determine a perturbed sample set (a combination of the combined real sample set and a random sample set) which can be used to determine a probability distribution. The probability distribution of the grouped terms can then be used in another round of the process of identifying and combining similar terms.

In accordance with one or more embodiments, system 602 can comprise an information retrieval engine which uses the semantic meanings of terms determined using the disclosed systems and methods to search and retrieve information relevant to a search query. For example, system 602 can be a server computer providing a search engine that searches and retrieves documents (web pages, content, etc.) semantically relevant to a search query.

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   receiving, at a computing device, a distributional similarity request associated with a pair of real sample sets, each real sample set of the pair comprising a number of real observations;
   determining, via the computing device, a pair of random sample sets for the pair of real sample sets, the determination comprising, for a random sample set of the pair, selecting a number of random observations from a domain of observations corresponding to the pair of real sample sets;
   determining, via the computing device, a pair of perturbed sample sets corresponding to the pair of real sample sets, a first perturbed sample set of the pair comprising a first one of the pair of real sample sets and a first one of the pair of random sample sets and a second perturbed sample set of the pair comprising a second one of the pair of real sample sets and a second one of the pair of random sample sets;
   determining, via the computing device, a pair of probability distributions corresponding to the pair of perturbed sample sets, a first probability distribution of the pair corresponding to the first perturbed sample set and comprising a probability for each of the number of real and random observations in the first perturbed set, a second probability distribution of the pair corresponding to the second perturbed sample set and comprising a probability for the each of the number of real and random observations in the second perturbed set; and
   automatically generating, via the computing device, a distributional similarity measure using the pair of probability distributions corresponding to the pair of perturbed sample sets, the distribution similarity measure corresponding to the pair of perturbed sample sets representing a degree of similarity between the pair of real sample sets associated with the distributional similarity request.

2. The method of claim 1, further comprising:
   communicating, via the computing device, the distribution similarity measure representing a degree of similarity between the pair of real sample sets in response to the request.

3. The method of claim 1, the pair of real sample sets correspond to a pair of time periods and to a user account associated with a computing system being monitored by an intrusion detection system, the number of real observations of a first real sample set of the pair comprising information identifying each resource access request made by the user account in a first of the pair of time periods, the number of real observations of a second real sample set of the pair comprising information identifying each resource access request made by the user account in a second of the pair of time periods, and the similarity measure representing a level of similarity in access requests for user account and the pair of time periods.

4. The method of claim 3, further comprising:
   making, by the intrusion detection system, a comparison between the level of similarity and a threshold level of similarity; and
   determining, by the intrusion detection system and based on the comparison, that the user account has been compromised using the comparison.

5. The method of claim 1, the pair of real sample sets corresponding to a user of a computing system being monitored by an intrusion detection system, one real sample set of the pair comprising, as the number of real observations, a number of resource access requests made by the user account to the computing system being monitored by the intrusion detection system, another real sample set of the pair corresponding to a user group to which the user is assigned and comprising, as its number of real observations, the number of resource access requests of the group of users, and the similarity measure representing a level of similarity for the user's access requests relative to the user group's access request.

6. The method of claim 5, further comprising:
   making, by the intrusion detection system, a comparison between the level of similarity and a threshold level of similarity; and
   determining, by the intrusion detection system and based on the comparison, that the user account has been compromised using the comparison.

7. A non-transitory computer-readable storage medium tangibly encoded with computer-executable instructions that when executed by a processor associated with a computing device perform a method comprising:
   receiving a distributional similarity request identifying a pair of real sample sets, each real sample set of the pair comprising a number of real observations;
   determining a pair of random sample sets for the pair of real sample sets, the determination comprising, for a random sample set of the pair, selecting a number of random observations from a domain of observations corresponding to the pair of real sample sets;
   determining a pair of perturbed sample sets corresponding to the pair of real sample sets, a first perturbed sample set of the pair comprising a first one of the pair of real sample sets and a first one of the pair of random sample sets and a second perturbed sample set of the pair comprising a second one of the pair of real sample sets and a second one of the pair of random sample sets;
   determining a pair of probability distributions corresponding to the pair of perturbed sample sets, a first probability distribution of the pair corresponding to the first perturbed sample set and comprising a probability for each of the number of real and random observations in the first perturbed set, a second probability distribution of the pair corresponding to the second perturbed sample set and comprising a probability for the each of the number of real and random observations in the second perturbed set; and
   automatically generating a distributional similarity measure using the pair of probability distributions corresponding to the pair of perturbed sample sets, the distribution similarity measure corresponding to the pair of perturbed sample sets representing a degree of similarity between the pair of real sample sets associated the with distributional similarity request.

8. The non-transitory computer-readable storage medium of claim 7, the pair of real sample sets correspond to a pair of time periods and to a user account associated with a computing system being monitored by an intrusion detection system, the number of real observations of a first real sample set of the pair comprising information identifying each resource access request made by the user account in a first of the pair of time periods, the number of real observations of a second real sample set of the pair comprising information identifying each resource access request made by the user account in a second of the pair of time periods, and the similarity measure representing a level of similarity in access requests for user account and the pair of time periods.

9. The non-transitory computer-readable storage medium of claim 7, the pair of real sample sets corresponding to a user of a computing system being monitored by an intrusion detection system, one real sample set of the pair comprising, as the number of real observations, a number of resource access requests made by the user account to the computing system being monitored by the intrusion detection system, another real sample set of the pair corresponding to a user group to which the user is assigned and comprising, as its number of real observations, the number of resource access requests of the group of users, and the similarity measure representing a level of similarity for the user's access requests relative to the user group's access request.

10. A computing device comprising:
a processor;
a non-transitory storage medium for tangibly storing thereon program logic for execution by the processor, the program logic comprising:
  receiving logic executed by the processor for receiving a distributional similarity request identifying a pair of real sample sets, each real sample set of the pair comprising a number of real observations;
  determining logic executed by the processor for determining a pair of random sample sets for the pair of real sample sets, the determination comprising, for a random sample set of the pair, selecting a number of random observations from a domain of observations corresponding to the pair of real sample sets;
  determining logic executed by the processor for determining a pair of perturbed sample sets corresponding to the pair of real sample sets, a first perturbed sample set of the pair comprising a first one of the pair of real sample sets and a first one of the pair of random sample sets and a second perturbed sample set of the pair comprising a second one of the pair of real sample sets and a second one of the pair of random sample sets;
  determining logic executed by the processor for determining a pair of probability distributions corresponding to the pair of perturbed sample sets, a first probability distribution of the pair corresponding to the first perturbed sample set and comprising a probability for each of the number of real and random observations in the first perturbed set, a second probability distribution of the pair corresponding to the second perturbed sample set and comprising a probability for the each of the number of real and random observations in the second perturbed set; and
  generating logic executed by the processor for automatically generating a distributional similarity measure using the pair of probability distributions corresponding to the pair of perturbed sample sets, the distribution similarity measure corresponding to the pair of perturbed sample sets representing a degree of similarity between the pair of real sample sets associated the with distributional similarity request.

* * * * *